United States Patent [19]
Cameron

[11] Patent Number: 5,919,366
[45] Date of Patent: Jul. 6, 1999

[54] EFFLUENT TREATMENT SYSTEM

[75] Inventor: Dean Osman Cameron, Maleny, Australia

[73] Assignee: Dowmus Pty. Ltd., Queensland, Australia

[21] Appl. No.: 08/930,208

[22] PCT Filed: Apr. 9, 1996

[86] PCT No.: PCT/AU96/00203

§ 371 Date: Oct. 6, 1997

§ 102(e) Date: Oct. 6, 1997

[87] PCT Pub. No.: WO96/31437

PCT Pub. Date: Oct. 10, 1996

[30] Foreign Application Priority Data

Apr. 7, 1995 [AU] Australia ............................. PN2223

[51] Int. Cl.⁶ .................................................. C02F 3/04
[52] U.S. Cl. ..................... 210/602; 210/617; 210/150; 210/170; 210/236
[58] Field of Search .................................. 210/150, 151, 210/170, 255, 284, 232, 236, 602, 617, 620

[56] References Cited

U.S. PATENT DOCUMENTS

| | | | |
|---|---|---|---|
| 832,245 | 10/1906 | Durbrow | 210/284 |
| 3,635,816 | 1/1972 | Golub | 210/602 |
| 4,209,388 | 6/1980 | DeFraites | 310/170 |
| 4,218,318 | 8/1980 | Niimi et al. | 210/150 |
| 4,285,719 | 8/1981 | Criss | 310/602 |
| 4,678,582 | 7/1987 | LaVigno | 210/602 |
| 4,793,929 | 12/1988 | Kickuth et al. | 210/602 |
| 4,990,031 | 2/1991 | Blowes et al. | 210/170 |
| 4,997,568 | 3/1991 | Vandervelde et al. | |
| 5,078,882 | 1/1992 | Northrop | 210/602 |
| 5,174,897 | 12/1992 | Wengrzynek | 210/170 |
| 5,240,611 | 8/1993 | Burton | |
| 5,273,653 | 12/1993 | Kickuth | |
| 5,419,838 | 5/1995 | DiTullio | 210/236 |
| 5,460,722 | 10/1995 | Chen | 210/150 |
| 5,507,944 | 4/1996 | Friedland et al. | 210/284 |

FOREIGN PATENT DOCUMENTS

| | | |
|---|---|---|
| 4317685 | 7/1986 | Australia . |
| 0382579 | 8/1990 | European Pat. Off. . |
| 53-133967 | 11/1978 | Japan . |
| 9323339 | 11/1993 | WIPO . |

*Primary Examiner*—Christopher Upton
*Attorney, Agent, or Firm*—Knobbe, Martens, Olsen & Bear, LLP

[57] ABSTRACT

A treatment system for liquid or liquid and solid effluent. The system is enclosed within a pipe, duct (10) or trench and comprises one or more sloping filter beds (12, 13, 14) with a population of effluent decomposing organisms such as earthworms and mothflies, and an overlying air space. The aqueous media effluent inlet (11) is located above the uppermost filter bed at an upper end and the solid waste input inlet (31), when included, is located downstream of the aqueous media inlet so that the aqueous media flows through and around the solid waste material. A filtrate outlet (28) is located downstream of the flow through the system and manual or conveyor means are provided for solids removal.

16 Claims, 3 Drawing Sheets

EFFLUENT TREATMENT SYSTEM

BACKGROUND OF THE INVENTION

THIS invention relates to the treatment of aqueous media and solid organic material to remove constituents which are hazardous or toxic to humans or the environment.

Conveyancing pipes or ducts used in conventional aqueous media treatment systems are not specifically engineered to effect any treatment, and consequently very little effective treatment occurs inside most pipes leading to or from treatment systems despite the fact that the pipes contribute substantially to the cost of the overall waste treatment system. In centralised sewerage treatment schemes the collection system can cost as much as the treatment plant to install. In a typical on-site treatment system for a single detached dwelling, 10 to 20 meters of 100 mm diameter pipework, or equivalent, leads to the treatment chamber, and a further 20 to 30 meters leads from the treatment chamber to the disposal/re-use area. Within the disposal area another 20 to 40 meters of pipe is commonly used in addition to trench support material, aggregate liners, and the like. Typically the treatment chamber is designed to be relatively large in order to provide sufficient retention time for treatment. Both aerobic and anaerobic treatment systems are typically bulky and deep in order to provide sufficient retention time for aqueous media treatment.

In sewered allotments there is much more than the equivalent of 60 meters of 100 mm diameter pipe, when a share of the common reticulation network is apportioned to each connection serviced Aqueous media pipes have much to recommend them as aerobic treatment systems. They have a vented air space available above the aqueous media level most of the time, are usually out of sight, and are often installed in the ground or in buildings where the extremes of temperature are moderated.

A method of using a bed of decomposed and decomposing solid organic waste material to filter aqueous media is known and used commercially. The method uses a relatively deep bed thickness to effect the filtration. It also employs a technique where the filter bed is more or less evenly loaded. This results in some practical constraints.

1. The outlet drain for the treated water is considerably lower than the aqueous media inlet pipe. This often results in a need to pump the effluent where the land is fairly flat or where the water table is high.
2. The bio-solids removed from the system are continually recontaminated, and pathogens are not deactivated before removal.
3. Opportunity exists during heavy loading periods for the bed to be temporarily inundated since the aqueous media cannot flow anywhere else. This results in a less diverse community of breakdown organisms being able to survive under these circumstances.
4. A treatment chamber with horizontally arranged long axis has a higher surface area than a vertically arranged treatment chamber.

OBJECT OF THE INVENTION

One object of the invention is to avoid the use of pipes whose sole function is to convey effluent to treatment systems.

Another object of the invention is to overcome the problems of existing effluent treatment systems as mentioned above.

SUMMARY OF THE INVENTION

According to the present invention there is provided an enclosed effluent treatment system incorporating a sloping filter bed with a living population of effluent decomposing organisms and an overlying air space, an aqueous effluent media inlet above the filter bed at an upper end thereof, a filtered aqueous media outlet and, optionally, a solid waste input region downstream of the aqueous media inlet and means for solids removal.

The invention thus covers both an aqueous media purification system and an aqueous media and solid organic waste treatment system. The term "effluent" used throughout the specification can refer to one or other of these input streams.

DETAILED DESCRIPTION OF THE INVENTION

Where more than one filter bed is configured, the beds are preferably stacked in vertical layers. Preferably there is a ventilated space between these beds.

The filter bed(s) is(are) enclosed to prevent contamination of the environment by the waste material or potential vectors of disease. The enclosure can typically comprise a pipe, duct or trench. A duct or pipe typically includes a longitudinal lower inner surface with the filter bed arranged above that surface and extending the length of the duct or pipe.

A solid organic waste input chute may be arranged downstream of the aqueous media inlet in such a way that the aqueous media is caused to flow through and around the solid organic waste material added through the input chute.

In one form of the invention, one of the filter beds functions as a conveyor belt to discharge decomposed organic material at a downstream end of the treatment system. In another form of the invention, decomposed organic material is transmitted through the or each filter bed and is removed from a downstream end of the treatment system by filtrate flow.

A means of collecting the filtrate which filters through the filter bed/s may be arranged below the lowest filter bed, or if the filtrate is not required, then the filtrate may infiltrate directly into the soil below the lowest filter bed.

The build up of decomposed organic matter, non-biodegradable solids or slime growth from the surface of the filter bed(s) is suitably carried out as required.

The treatment system can be mounted free standing or suspended below a floor, buried under a floor slab or buried in the ground, or have any other suitable configuration for the particular treatment being carried out.

A flow of aqueous media to be treated enters the system via an aqueous media pipe or series of pipes and is caused to pass along and through the filter bed(s).

If the system is designed to treat solid organic waste material then the organic waste material is either placed directly in the system in a more or less unprocessed form, for instance from a food waste scrap bucket or wastepaper bin or the like, through the solid waste entry chute located downstream of the aqueous media entry pipe, or it may be processed through a waste grinder and so enter the system as a constituent of the aqueous media. The input flow of aqueous media washes and deposits the solid organic waste material along the surface of the filter bed. The liquid portion of the aqueous media infiltrates into the filter material which forms the bed and can be either collected for some reuse purpose or discharged onto a second filter bed or into the soil. The solid organic waste material is retained in and on the filter bed.

The size of the air space required above the filter bed is determined by the largest particle size of the solid organic material added to the filter bed.

The waste matter added to the filter bed decomposes rapidly in the presence of the moisture and air contacting the organic fragments left behind as the liquid portion passes through the filter bed.

Air above and through the pore spaces in the filter bed, moisture from the aqueous media, and energy and nutrients in the solid organic matter or dissolved and suspended in the aqueous media, provide a very good environment for organic decay by endemic microorganisms in the aqueous media, and introduced or ubiquitous invertebrates and microbes living in and on the decomposing and decomposed organic material.

One form of the present invention uses actively decomposing solid waste and fully composted waste as a physical and biological filter medium for waste water.

Solid putrescible wastes adjacent the entry will act as a media for biofilm growth as aqueous media is applied. Large discrete waste particles are continually added and continually digested by the organisms and eroded by aqueous media so that they are constantly breaking up into smaller and smaller particles ultimately forming stable humic colloids and dissolved humic compounds. The wetting and drying cycles combined with the extrusion of discrete worm casts and insect and mite frass create a relatively stable compost crumb structure within the compost bed formed from the decomposed solids in the enclosure.

The movement of worms, beetles, mites, collembola and insect larvae throughout the compost aerates the compost medium and prevents the internal drainage of the bed from blocking. Thus the compost bed comes to act like a well drained soil bed with a huge wetted surface area for oxygen exchange. Air is drawn into the compost bed every time waste water is pulsed onto it by normal sporadic household usage. Partial inundation of the compost bed surface occurs with normal usage. Where this happens, waste water infiltrates rapidly through the biopores and acts like a hydraulic piston to draw fresh air into these pore spaces.

Unlike aquatic treatment systems, the present invention quickly filters out the larger solid wastes (which have a high oxygen demand) onto the surface of the compost bed where they are surrounded by air. Since air is 22% oxygen, and has much faster diffusion rates than water, much higher biological loadings can be treated this way.

If the solid organic waste material input is large the solid organic fragments themselves form a large surface area media which acts as a trickling filter aggregate when wetted by the aqueous media flowing over and around such fragments.

The compost produced by the decay of the solid organic waste material which accumulate on the surface of the filter bed acts as a fine aerobic filter medium and adsorptive treatment contact surface.

The enclosure is constructed so that the aqueous media is caused to flow longitudinally along the sloping surface of the filter bed away from the input end of the enclosure.

The surface of the filter bed and any organic matter build-up is prevented from blocking by the action of worms, mothflies, mites, collembola and other soil organisms.

The infiltration rate and surface area exposed to the air can be increased by adding a bulking agent such as polystyrene beads or granules to the surface of the filter bed.

The fine compost like organic media provides a habitat for invertebrates and microbes feeding on the organic material.

The compost bed acts as a self regenerating filter medium for the waste water and can also be used to create a suitable habitat to support organisms which decompose solid organic wastes into stable humic compounds.

The waste water may flow into the pipe or duct at one or more points along the pipe or duct.

The waste water will infiltrate into the compost bed over various distances along the length of the compost bed depending on the input flow rate, duration, and waste water infiltration rate. A high flow rate over an extended period of time will infiltrate for the greatest distance along the compost bed. For any particular situation, it is preferred that the compost bed be long enough so that a far end portion of the bed will be only wetted occasionally during peak hydraulic loading events.

The infiltration rate will vary along the length of the compost bed according to the permeability of the combined solid waste layer, compost bed and compost bed support medium. In the frequently wetted high flow zone a zoogloeal slime of microorganisms and fine particulate solids can coat the surface of the compost bed and particulate solid wastes and lead to a lower permeability in the influent high loading zone than that at the limit of infiltration. This desirable phenomenon will also be observed laterally across the surface of the filter bed if the inner surface is curved so that the lowest point is away from the edges of the bed.

Solid wastes are distributed over the surface by the flowing waste water. The pattern of distribution is related to the waste water velocity, hydraulic flow and infiltration pattern along the compost bed as well as the solids particle size, shape, buoyancy, stickiness, mechanical strength, decomposition rate and errodability. Erosion of the surface of the compost/solid waste deposits is related to the waste water velocity as well as the surface characteristics. Erosion in general moves smaller crumbs or particles but movement of larger fragments can also occur where large aqueous media flow rates can carry large buoyant solids along the filter bed to the point where the friction between the solid particle and the filter bed is greater than the frictional drag on the solid particle produced by flowing aqueous media.

Typically, the shape and length of the enclosure and filter bed are so arranged, and organisms therein are so managed, that the rate of compost removed from the enclosure is approximately equal to the amount of compost produced.

Bio-solids are produced by the system which can be harvested as structured compost like material. Harvesting should preferably occur after a period of low hydraulic inputs to the system.

Filtered effluent is also discharged from below the lowest filter bed. It may be allowed to infiltrate into the soil without further treatment or it may be collected and reused for some specific purpose. Where secondary filter beds are employed the filtrate can be of sufficient quality to safely reuse for toilet flushing, garden watering, and the like.

The solid organic material is progressively moved from the entry point to the discharge end as it decomposes by various methods as described below.

Biological activity can also result in the mass movement of solids. In particular the activity of composting worms and various species of insects (such as mothfly larvae) produces small friable castings and frass which are usually deposited in such a way as to level out the longitudinal surface topography of the compost bed. Because of a preference of worms to cast in the drier edge zones, the lateral curve of the bed surface is maintained. This activity decreases the bulk density of the compost bed surface and also increases the infiltration rate. The combined effect is to increase the errodability of the surface during high surface flow rates.

The biological activity will stabilise in time to reflect the complex interaction of various critical gradients such as moisture content, food availability, oxygen supply and temperature. Population gradients which relate to each particular organism's ability to competitively exploit a particular habitat niche will be evident.

In time selective pressure will result in the evolution of more precisely adapted organisms from all the species represented, which can exploit hotter, wetter or lower oxygen zones more efficiently.

Blockage of the surface flow could occur if particulate build up on the filter bed occurs to the point where peak flow is dammed within the duct and does not disperse the build-up of solids over a sufficient area to allow the maintenance of a dynamic equilibrium between deposition and decomposition rates.

Biological activity maintains the height of the compost/solid waste surfaces in a dynamic equilibrium. This means that solids are washed down the length of the compost bed and moved downwards through the solids permeable compost bed through washing and biological activity at the same rate as they are deposited. Internal blockages can occur if the bed support material has a pore size too small to transmit very fine solids and these accumulate within the bed and slow the infiltration rate down to the point where the hydraulic application rates consistently exceed filter bed infiltration rates. To avoid this the bed can be configured to be permeable to very fine colloidal solids or to larger particle sizes by manipulating the pore size of the bed material.

In practice where a reasonably high solid organic waste material application rate applies, a medium with a 0.5 mm to 1 mm pore size has been shown to maintain an effective dynamic compost layer equilibrium in the upper layer.

If faster solid throughput rates are required for very high solid organic waste material application rate systems, the pore size would be increased appropriately.

Where the aqueous media is relatively clean, the media used in the filter bed can be very fine and granular and should be soil and litter organisms such as earth worms and/or mothflies to consume the growth of microorganisms which grow on and are filtered out by the media. Fine sand, powdered activated carbon or other suitable granular material usually with an effective particle size of 0.1 mm or less are two preferred media if the filtrate is to be recycled for flushing or a similar use. Where the aqueous media application rate exceeds the infiltration rate there will be a surface flow. This can be used to advantage to transport the fine composted solid organic waste material to the lower end of the treatment system where it can be conveniently accessed for removal.

The size of the pipe or duct required will depend on the solids and hydraulic loading rates applied. High solids loadings will require steeper gradients and hence higher waste water flow velocities to produce a larger surface area and hence infiltration zone. The slope of the pipe or duct should be such that the deposition of solid materials is spread evenly along a sufficiently long length of the compost bed to allow the decomposition and compost removal rate to equal the raw solids deposition rate.

A range of filter bed gradients can be used depending on the solid application rate, size of the solids applied and aqueous media application rates. The slope of the filter bed should be designed to achieve more even solids distribution over the surface of the filter bed.

If the treatment duct gradient is high, transverse baffles perpendicular to the waste water flow direction may be required to prevent the compost bed from eroding too quickly and allowing unfiltered waste water to pass through the supporting material openings. Because the infiltration rate and errodability of the solid organic waste material and bed medium will vary along the length of the treatment duct, the gradient of the filter bed may also need to be adjusted along the length of the treatment duct for some applications.

Where the bed is to be mechanically progressed it is preferable to design the system so that the peak flow infiltration zone stops well short of the end of the compost bed so as to allow a compost maturation zone which is not re-contaminated by pathogens from the waste water prior to harvesting.

In a low solids loading situation passive transport of solids by waste water movement and biological activity could be used in conjunction with periodic servicing of the bed to remove non-compostable and slowly degradable composted solids. Such servicing could be effected by a jet or series of water jets directed onto the compost bed in such a way as to flush off surface build-up of compost and non-compostable solids.

These fine composted solids could be filtered out of the filtrate by a filtration material located at the filtrate discharge point/s or filtered out by a second finer, in duct filter bed medium, positioned so as to accept the primary compost bed filtrate and the organic solids washed through the primary filter bed.

In the case of high solids input rates and or the addition of large non-compostable solids such as plastics, glass or metals, it may be necessary to form the compost bed to be movable so as to discharge the build up of solid material at some point or points along the length of the container. Ideally the discharge of solid material would only occur after a sufficient interval has elapsed from when fresh wastes were last deposited to allow for their complete decomposition to pathogen free stable humus.

The internal volume within the container, duct or pipe must be large enough to prevent the occlusion of the pipe given a specific solid organic waste material movement rate and solids deposition rate. The movement of the solids in a high solids loading application may be effected by forming the compost bed support medium into an endless conveyor belt and causing it to rotate slowly or in pulses toward the compost discharge point(s). A motor or mechanism driven by the combined water flow into the building serviced could be used to provide a regulated movement related to aqueous media flow rates.

The enclosure, pipe or ducting employed to hold compost is preferably so sized and dimensioned as to cater for the particular waste loadings for the environment of use.

Preferably, the filter bed comprises a non-biodegradable support media, such as durable fibre wadding, durable thermo-plastic textile or linear drainage ducting, extending along the enclosure dividing the enclosure into upper and lower regions and being adapted to pass aqueous media and finely divided organic material, the upper region being adapted to hold partially decomposed organic material and compost, and the enclosure having a cross-section and length, and supporting sufficient filtration media so that aqueous media entering the enclosure is absorbed in the length of compost in the enclosure. The enclosure can include a means for dislodging or washing off undesirable surface build up from the filter bed. In one example, the dislodging or washing off means comprises a plurality of water jets spaced along the enclosure and control means to operate the jets at predetermined times.

In another embodiment, a secondary filter bed can be employed beneath the primary filter bed. This enables removal of fine particulate organic material which wash through the coarse primary filter bed media.

In this application of the present invention to in-duct or in-pipe treatment a long thin compost bed is formed on a fixed or movable support medium, typically a non-biodegradable thermo-plastic fibrous material within the duct or pipe.

DESCRIPTION OF THE DRAWINGS

In all of the drawings, like reference numerals refer to like parts.

DESCRIPTION OF PREFERRED EMBODIMENTS

EXAMPLE 1

This example concerns a duct treatment system for treating wastewater and solid organic waste so as to recover and store the filtrate for reuse in toilet flushing or like grey water applications.

Figure 1:
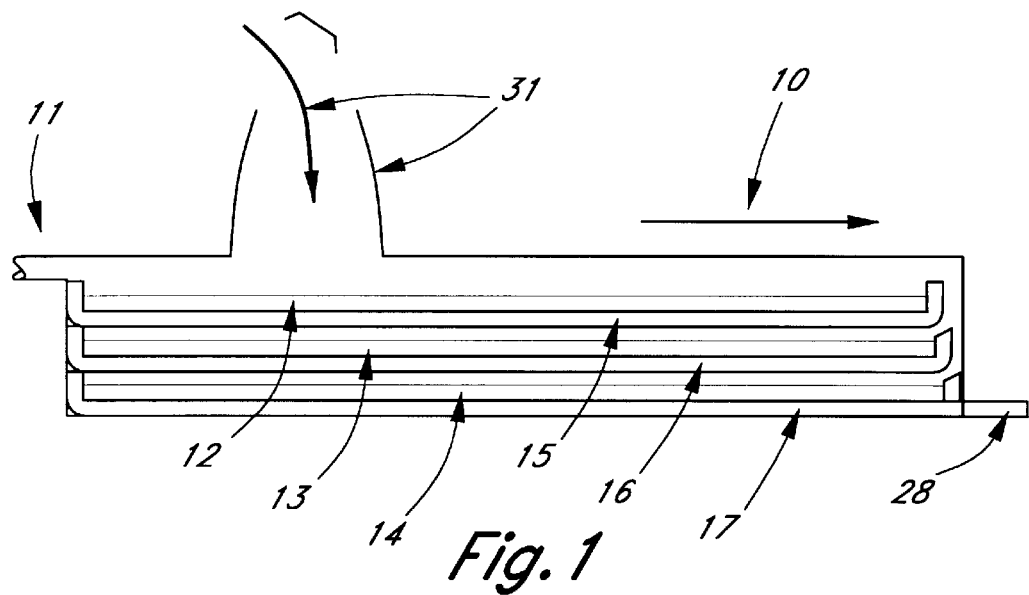
FIG. 1 is a cross-sectional view of an enclosed effluent treatment system according to one aspect of the present invention.
Figures 3, 4:
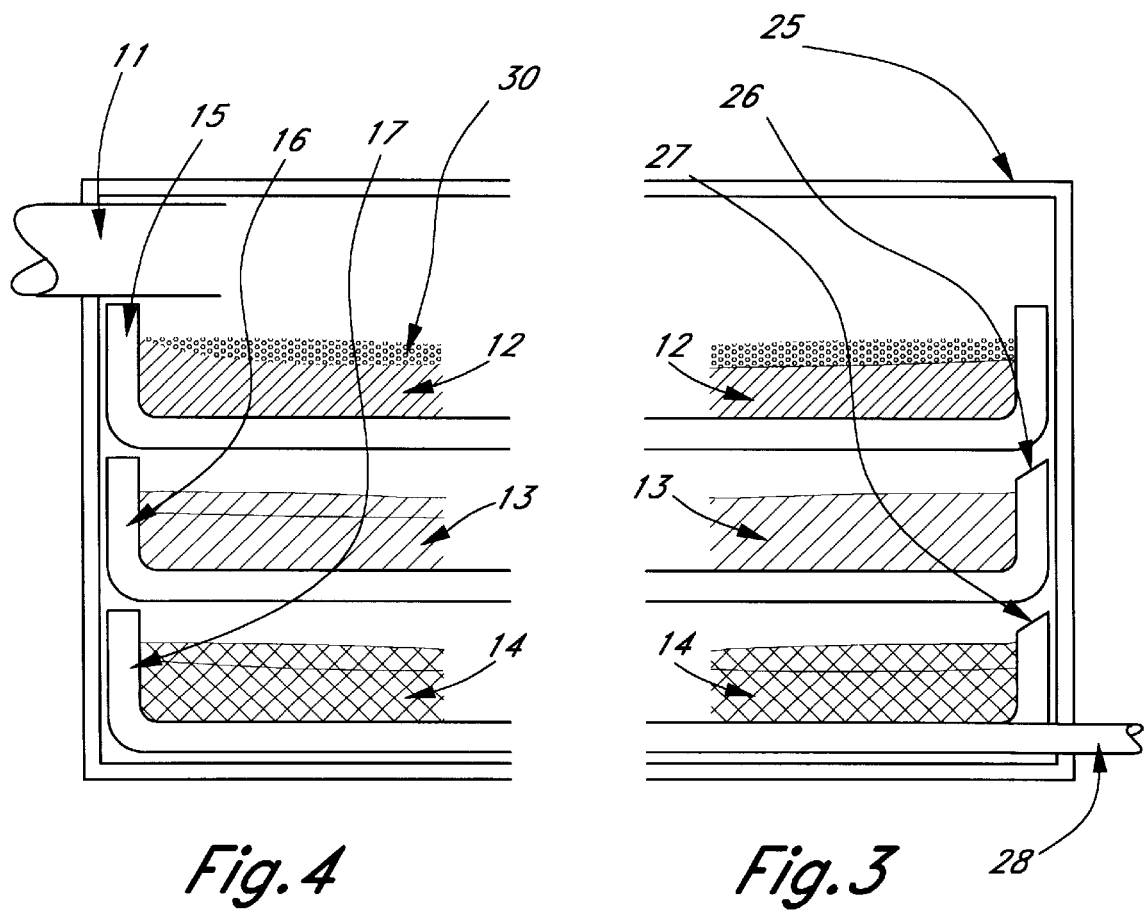
FIG. 3 is an enlarged partial view of the left end section illustrated in FIG. 1.
FIG. 4 is an enlarged partial view of the right end section illustrated in FIG. 1.
Figure 2:
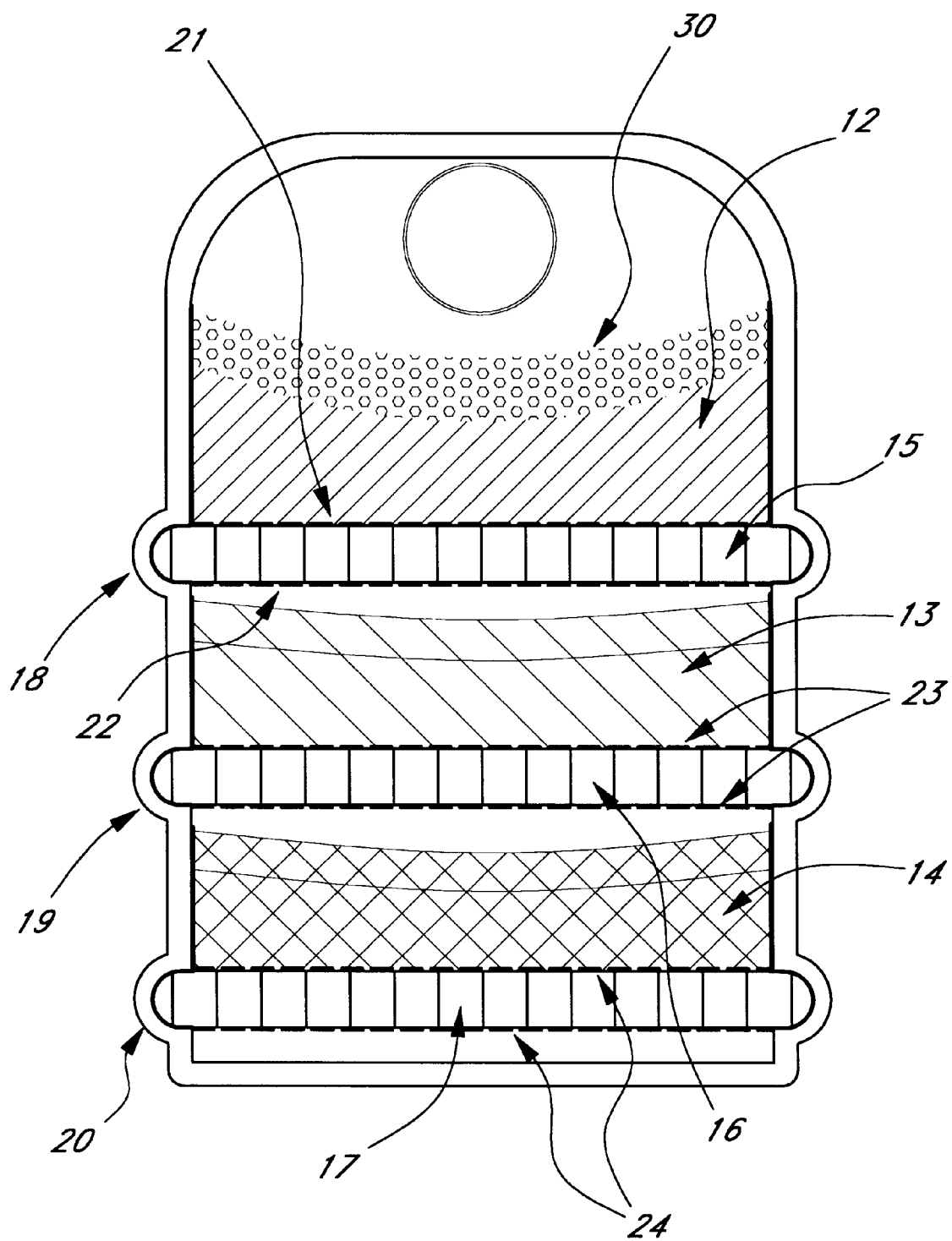
FIG. 2 is an enlarged end-sectional view of the system of FIG. 1.
Figure 5:
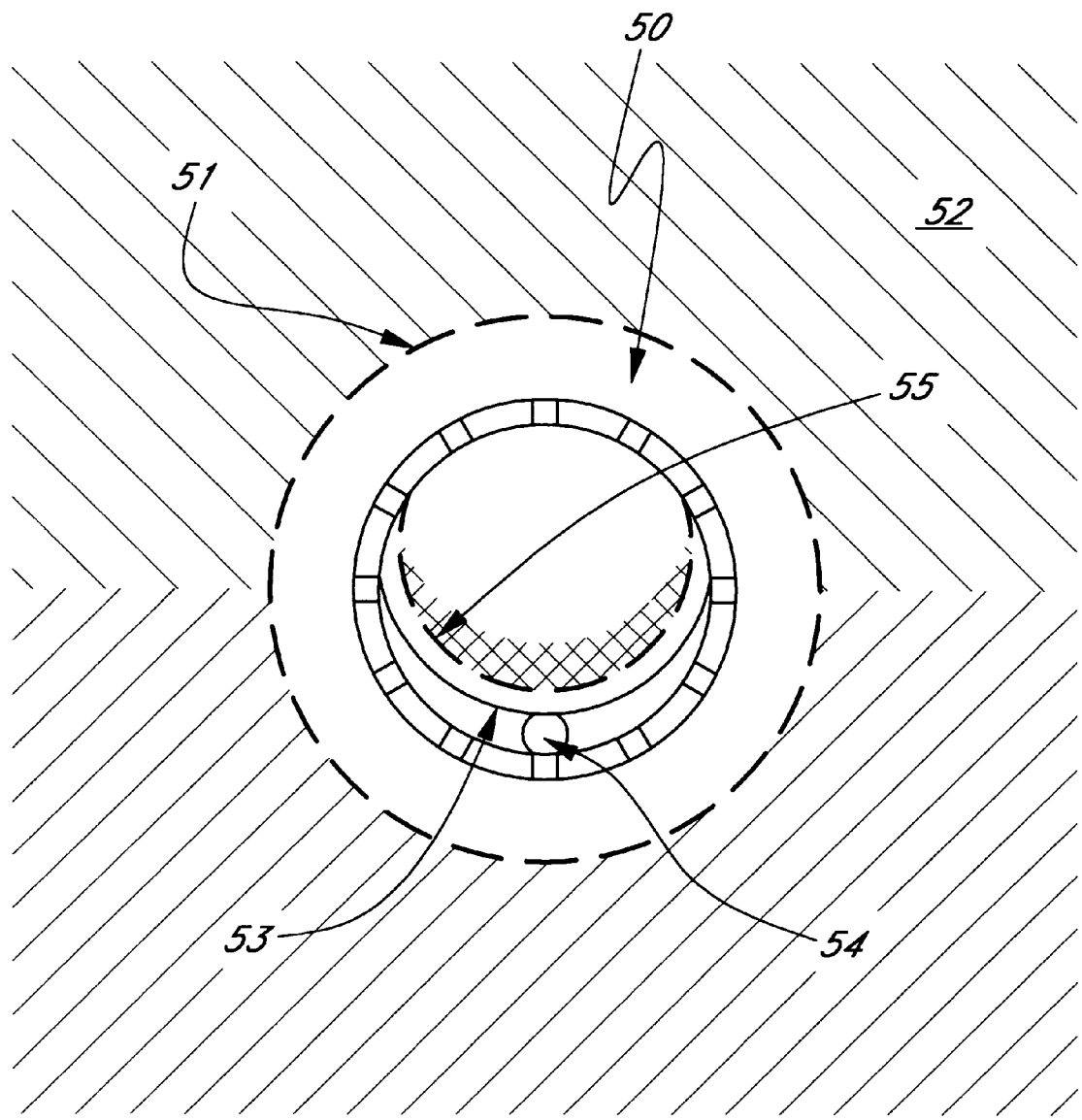
FIG. 5 is an end-sectional view of an enclosed effluent treatment system according to another aspect of the present invention.

Referring to FIGS. 1 to 4, the treatment system comprises an extruded plastic duct 10 with appropriate reinforcement ribbing, as the treatment enclosure. The enclosure is mounted on an inclination of approximately 1:100 with the higher end containing the inlet 11 for wastewater and solid organic waste material.

Three filter beds 12, 13, 14 are supported by three drainage support elements 15, 16, 17 which are slidably removable in grooves 18, 19, 20 located on the sides of the duct. Sides are provided on the drainage support elements to contain the filter media placed or formed thereon and so as to enable the entire filter beds and support elements to be clearly removed for servicing or media replacement.

The drainage support element beds are provided with material covers both above and below the horizontal surfaces. The uppermost drainage support element 15 is provided on its upper surface with a knitted thermoplastic fibre material 21 having a hole size of approximately 1 mm. The lower surface of the drainage support element 15 has a geotextile fabric 22 adhered thereto. A similar geotextile fabric 23, 24 is fitted to the other two support elements, over their upper and lower surfaces.

Ventilation spaces 25, 26, 27 are provided at each end of the drainage support elements to enable excess wastewater to bypass in high loading times. At the downstream end there is provided a drainage passageway to enable this water to bypass to the secondary and tertiary filter beds 13, 14.

A solids input chute 31 is located on the downward slope spaced from the wastewater inlet 11 and a filtrate outlet 28 is located at the lowermost region of the enclosure.

In use, wastewater enters by way of inlet 11 and waste solids by way of chute 31. The chute is arranged so as to cause the wastewater to flow through and around the waste solids on the primary filter bed 12. The primary filter bed is designed to enable fine composted material to wash through the bed assisted by the action of the organisms in the bed. Once through this layer the fine compost accumulates over the geotextile layer and forms a second thin filtration bed of compost. The compost in this layer is only slightly heavier than water and is easily eroded and carried down stream and discharged through the drain hole 20. Once deposited onto the second filter bed 13 the fine suspended solid organic material is easily removed during low water usage periods by removing a duct end cover and sliding out the filter bed support element.

The upper filter bed 12 can be made to work more efficiently by adding polystyrene foam beads or some similar bulking material 30 to the surface of the filter bed.

The filtrate exiting from the outlet 28 is suitable for collection and used in recovered water applications such as toilet flushing, landscape irrigation and such like.

EXAMPLE 2

In this example there is no requirement to reuse the filtrate. In this case a slotted ribbed pipe 50 of at least 150 mm is wrapped in geotextile fabric 51 and mounted on a bed of fine sand 52 and backfilled with 20 mm rock aggregate or similar. The lumen of the pipe has a removable element 53 of slotted drainage pipe which has a spacer 54 under it and a thermoplastic knitted mesh fabric 55 with a hole size of approximately 1 mm. The pipe may be continuously formed between the waste water source and a biosolids collection pit, or may connect several point sources and have biosolids collection pits at appropriate intervals. The effluent discharged through slots 56 in the pipe infiltrates into the soil under and surrounding the pipe. The removable element 53 in the lumen of the pipe enables servicing of the filter bed at long intervals to remove any accumulated non-compostable solids.

I claim:

1. An enclosed effluent treatment system comprising a sloping filter bed with a living population of effluent decomposing invertebrates and microbes and an overlying air space, an aqueous media effluent inlet above the filter bed at an upper end thereof, a filtered aqueous media outlet, a solid waste input region downstream of the aqueous media inlet and means for solids removal.

2. A treatment system as claimed in claim 1, wherein the filter bed comprises a plurality of filter beds stacked in vertical layers.

3. A treatment system as claimed in claim 1 or claim 2, wherein the filter bed(s) is(are) enclosed within a duct, pipe or trench.

4. A treatment system as claimed in claim 1 or claim 2, wherein the filter bed(s) is(are) enclosed within a duct and is(are) removable through the ends of the duct.

5. A treatment system as claimed in claim 1 or claim 2, wherein the solid waste input region comprises a chute which allows aqueous media to flow through and around solid waste material added by way of the chute.

6. A treatment system as claimed in claim 1 or claim 2, wherein the uppermost filter bed is partially comprised of a compost bed.

7. A treatment system as claimed in claim 1 or claim 2, wherein the or at least one of the filter beds is comprised of a granular material which is populated with earthworms and/or mothflies.

8. A treatment system as claimed in claim 1 or claim 2, wherein the filter bed(s) is(are) enclosed within a trench and the filtered aqueous media outlet is the ground forming the base of the trench.

9. A treatment system as claimed in claim 1 or claim 2, wherein a bulking material is added to the surface of the or each filter bed to increase the aerobic capacity and infiltration rate.

10. A treatment system as claimed in claim 1 or claim 2, wherein the filter bed(s) is (are) enclosed within a duct constructed from ribbed thermo-plastic with longitudinal grooves formed in the sides to support a removable thermoplastic drainage and support element.

11. A treatment system as claimed in claim 1 or claim 2, wherein the effluent decomposing organisms are selected from the group consisting of earthworms, beetles, mites, and insect larvae.

12. An enclosed effluent treatment system comprising a sloping filter bed within a duct constructed from ribbed thermoplastic having longitudinal grooves formed in the sides to support a removable thermoplastic drainage and support element, said filter bed having a living population of effluent decomposing invertebrates and microbes and an overlying air space, an aqueous media effluent inlet above the filter bed at an upper end thereof, a filtered aqueous media outlet and a solid waste input region downstream of the aqueous media inlet and means for solids removal.

13. A treatment system as claimed in claim 12, wherein the filter bed comprises a plurality of filter beds stacked in vertical layers.

14. A method of treating solid waste effluent and aqueous media effluent, said method comprising:

introducing said aqueous media effluent into an aqueous media effluent inlet;

introducing said solid waste effluent into a solid waste input region downstream of the aqueous media inlet;

flowing said aqueous media effluent and solid waste effluent onto a sloping filter bed with a living population of effluent-decomposing invertebrates and microbes and an overlying air space;

filtering and decomposing said aqueous media effluent and solid waste effluent through said filter; and removing resulting filtered and decomposed aqueous media and solids.

15. The method of claim 14, wherein the sloping filter bed and overlying air space are in an enclosed structure.

16. The method of claim 14, wherein the filter bed comprises a plurality of filter beds stacked in vertical layers, and wherein the filtering and decomposing step comprises transmitting partially filtered and decomposed aqueous media effluent and solid waste effluent from one filter bed to another.

* * * * *